United States Patent
Kubota et al.

(10) Patent No.: US 12,551,427 B2
(45) Date of Patent: Feb. 17, 2026

(54) VISCOUS AQUEOUS COMPOSITION AND SKIN EXTERNAL PREPARATION

(71) Applicant: DKS Co. Ltd., Kyoto (JP)

(72) Inventors: Akiyo Kubota, Kyoto (JP); Yosuke Goi, Kyoto (JP)

(73) Assignee: DKS Co. Ltd., Kyoto (JP)

( * ) Notice: Subject to any disclaimer, the term of this patent is extended or adjusted under 35 U.S.C. 154(b) by 332 days.

(21) Appl. No.: 18/006,617

(22) PCT Filed: Sep. 21, 2021

(86) PCT No.: PCT/JP2021/034482
§ 371 (c)(1),
(2) Date: Jan. 24, 2023

(87) PCT Pub. No.: WO2022/075052
PCT Pub. Date: Apr. 14, 2022

(65) Prior Publication Data
US 2023/0263719 A1    Aug. 24, 2023

(30) Foreign Application Priority Data
Oct. 7, 2020 (JP) .................................. 2020-170184

(51) Int. Cl.
*A61K 8/73*    (2006.01)
*A61K 8/06*    (2006.01)
*A61Q 19/00*   (2006.01)

(52) U.S. Cl.
CPC .............. *A61K 8/731* (2013.01); *A61K 8/062* (2013.01); *A61Q 19/00* (2013.01); *A61K 2800/262* (2013.01); *A61K 2800/48* (2013.01)

(58) Field of Classification Search
CPC .. A61K 8/731; A61K 8/062; A61K 2800/262; A61K 2800/48; A61Q 19/00
See application file for complete search history.

(56) References Cited

U.S. PATENT DOCUMENTS

| | | | |
|---|---|---|---|
| 2016/0319467 A1 | 11/2016 | Yamato et al. | |
| 2018/0118991 A1* | 5/2018 | Yoshida | C08L 1/04 |
| 2019/0194831 A1 | 6/2019 | Yamato et al. | |
| 2023/0118481 A1* | 4/2023 | Fukui | C08L 1/02 |
| | | | 523/202 |

FOREIGN PATENT DOCUMENTS

| | | |
|---|---|---|
| JP | 2012-126786 A | 7/2012 |
| JP | 2015-143336 A | 8/2015 |
| JP | 2016-183329 A | 10/2016 |
| JP | 2017-110085 A | 6/2017 |

OTHER PUBLICATIONS

"Organic and Inorganic Values" Nihon Emulsion Co., Ltd. 2015 (Year: 2015).*
International Search Report issued Nov. 22, 2021 in PCT/JP2021/034482 filed on Sep. 21, 2021, 3 pages.
English Translation of Office Action issued Apr. 16, 2021, in Japanese Application No. 2020-170184 filed on Oct. 7, 2020, 4 pages.

* cited by examiner

*Primary Examiner* — Frederick F Krass
*Assistant Examiner* — Toriana N. Vigil
(74) *Attorney, Agent, or Firm* — Oblon, McClelland, Maier & Neustadt, L.L.P.

(57) ABSTRACT

Provided is a viscous aqueous composition that has high transparency and high thickening performance, has high emulsifying power for oil-based raw material, or exerts strongly, in the case of being mixed with a water-miscible organic solvent, a viscosity retention effect.
A viscous aqueous composition according to an embodiment includes (a) an anion-modified cellulose fiber including anionic groups forming salts with monoamines, and including, as the monoamines, a monoamine (A) having, in an organic conceptual diagram, an organic value of 200 or more and a monoamine (B) having an organic value of less than 200, and (b) water.

10 Claims, No Drawings

VISCOUS AQUEOUS COMPOSITION AND SKIN EXTERNAL PREPARATION

CROSS-REFERENCE TO RELATED APPLICATIONS

This application is a national stage application of International Application No. PCT/JP2021/034482, filed Sep. 21, 2021, which is based upon and claims the benefit of priority to Japanese Patent Application No. 2020-170184, filed Oct. 7, 2020. The entire contents of these applications are incorporated herein by reference.

TECHNICAL FIELD

The present invention relates to a viscous aqueous composition, and an emulsion composition, a solvent-containing viscous composition, and a skin external preparation that use the viscous aqueous composition.

BACKGROUND ART

Products having the form of cream, gel, milky lotion, or liquid are used in various applications including cosmetics and pharmaceuticals such as skin external preparations. In such products, compositions prepared by adding a polymer material or the like to a dispersion medium such as water or alcohol are used, and the polymer material is used in order to impart thickening performance or dispersion stability.

In recent years, from the viewpoint of effective use of biomass present in large amounts in nature, use of cellulose fiber in various ways has been studied and viscous aqueous compositions including cellulose fiber have been proposed.

For example, Patent Literature 1 discloses a viscous aqueous composition containing an anion-modified cellulose fiber in which carboxy groups serving as anionic groups form salt with a monoamine having an organic value of 300 or less in the organic conceptual diagram, and water.

Patent Literature 2 discloses a viscous aqueous composition containing an anion-modified cellulose fiber in which anionic groups form salt with an organic compound having an organic value of 450 or less in the organic conceptual diagram, water, and a water-miscible organic solvent.

Patent Literature 3 discloses a viscous aqueous composition containing an anion-modified cellulose fiber in which carboxy groups serving as anionic groups form salt with an alkali metal, and a compound having carbon atoms and a nitrogen atom such that their ratio (number of carbon atoms/number of nitrogen atom) in a single molecule of the compound is 3 or more and 45 or less.

CITATION LIST

Patent Literature

PTL 1: Japanese Unexamined Patent Application Publication No. 2012-126786
PTL 2: Japanese Unexamined Patent Application Publication No. 2017-110085
PTL 3: Japanese Unexamined Patent Application Publication No. 2016-183329

SUMMARY OF INVENTION

Technical Problem

However, some existing viscous aqueous compositions contain cellulose fiber insufficiently defibrated and have poor transparency or poor thickening performance. Alternatively, even when such compositions have high transparency or high thickening performance, in the case of being added together with, for example, oil-based raw materials to try to obtain emulsion compositions, emulsifying power for the oil-based raw materials is insufficient, so that it has been difficult to achieve both of segmentation of cellulose fiber due to sufficient defibration and emulsifying power. In addition, for example, addition of a water-miscible organic solvent such as alcohol results in a considerable decrease in the viscosity, so that it has been difficult to impart sufficient thickening performance.

Under such circumstances, an object of embodiments of the present invention is to provide a viscous aqueous composition that has high transparency and high thickening performance, and has high emulsifying power for an oil-based raw material or exerts strongly, in the case of adding a water-miscible organic solvent, a viscosity retention effect.

Solution to Problem

The present invention encompasses the following embodiments.

[1] A viscous aqueous composition including a component (a) and a component (b) below:
(a) an anion-modified cellulose fiber including anionic groups forming salts with monoamines, and including, as the monoamines, a monoamine (A) having, in an organic conceptual diagram, an organic value of 200 or more and a monoamine (B) having an organic value of less than 200; and
(b) water.
[2] The viscous aqueous composition according to [1], wherein the monoamine (A) and the monoamine (B) satisfy a molar ratio A/B of 0.1/99.9 to 80/20.
[3] The viscous aqueous composition according to [1] or [2], wherein the monoamine (A) has an organic value of 240 or more and the monoamine (B) has an organic value of 180 or less.
[4] An emulsion composition including the viscous aqueous composition according to any one of [1] to [3], and an oil-based raw material.
[5] The emulsion composition according to [4], being used as a skin external preparation.
[6] A solvent-containing viscous composition prepared by mixing the viscous aqueous composition according to any one of [1] to [3] with a water-miscible organic solvent, wherein a content of the water-miscible organic solvent is 10 to 95 mass %.
[7] The solvent-containing viscous composition according to [6], being used as a skin external preparation.

Advantageous Effects of Invention

Embodiments according to the present invention can provide a viscous aqueous composition that has high transparency and high thickening performance, and has high emulsifying power for an oil-based raw material or exerts strongly, in the case of adding a water-miscible organic solvent, a viscosity retention effect.

DESCRIPTION OF EMBODIMENTS

A viscous aqueous composition according to this embodiment includes a specific anion-modified cellulose fiber serving as a component (a) and water serving as a component (b).

[(a) Anion-Modified Cellulose Fiber]

The anion-modified cellulose fiber is a cellulose fiber in which glucose units serving as constituent units of cellulose molecules have anionic groups, and the anionic groups form salts with monoamines.

To all the glucose units constituting a cellulose molecule, one or one or more anionic groups may be bonded; alternatively, to some of the glucose units constituting a cellulose molecule, one or one or more anionic groups may be bonded.

The anionic group refers to a substituent that exhibits anionicity. The anionic group can be, for example, a carboxy group, a phosphate group, a sulfate group, or a sulfo group, and any one of or two or more of the foregoing can be employed. Such an anionic group may be directly bonded to or indirectly bonded to a glucose unit. In the case of indirect bonding, between the glucose unit and the anionic group, for example, an alkylene group having 1 to 4 carbon atoms may be present. For such anionic groups, as long as a salt form containing a monoamine as a counter ion (for example, in the case of a carboxy group, —COOX where X is a monoamine forming salt with the carboxylic acid) is included, an acid form (for example, in the case of a carboxy group, —COOH) may be included or a salt form including, as a counter ion, a cation not being monoamine may be included.

In the anion-modified cellulose fiber, the anionic group content is not particularly limited. For example, the content relative to the dry mass of the anion-modified cellulose fiber may be 0.05 to 3.0 mmol/g, may be 0.5 to 2.8 mmol/g, or may be 0.6 to 2.5 mmol/g. Note that, in this DESCRIPTION, "dry mass" means a mass after drying at 140° C. is performed until a mass change ratio per minute reaches 0.05% or less.

The anionic group content can be measured in the following manner: for example, in the case of a carboxy group, 60 mL of an anion-modified cellulose fiber-containing slurry is prepared so as to have a concentration of 0.5 to 1 mass %, and adjusted using a 0.1 mol/L aqueous hydrochloric acid solution to a pH of about 2.5; subsequently, a 0.05 mol/L aqueous sodium hydroxide solution is added dropwise during which measurement of electric conductivity is performed, which is continuously performed until the pH reaches about 11; from the amount of sodium hydroxide (V) consumed in the weak-acid neutralization stage in which electric conductivity changes gently, the anionic group content can be determined by a formula below. Such a measurement of electric conductivity can be similarly performed for a phosphate group to achieve determination. Publicly known methods can be performed for other anionic groups to achieve determination.

$$\text{Anionic group content (mmol/g)} = V \text{ (mL)} \times [0.05/\text{Mass of anion-modified cellulose fiber (g)}]$$

In the anion-modified cellulose fiber according to this embodiment, anionic groups are neutralized by monoamines and turned into salts. Such a monoamine may be a primary amine, may be a secondary amine, may be a tertiary amine, may be a quaternary ammonium, or may be ammonia. The monoamine is preferably at least one selected from the group consisting of a primary amine, a secondary amine, a tertiary amine, and ammonia, more preferably at least one selected from the group consisting of a primary amine, a secondary amine, and a tertiary amine. Note that the amine in this embodiment refers to an amine in a broad sense encompassing even alkanolamines.

This embodiment has a feature of using, as such monoamines, a combination of a monoamine (A) having, in the organic conceptual diagram, an organic value of 200 or more, and a monoamine (B) having an organic value of less than 200. In other words, the anion-modified cellulose fiber has an anionic group forming a salt with the monoamine (A) having an organic value of 200 or more, and an anionic group forming a salt with the monoamine (B) having an organic value of less than 200. Such a combined use of the monoamine (A) and the monoamine (B) can improve the degree of defibration of the cellulose fiber to improve the transparency and thickening performance of the viscous aqueous composition. In addition, the emulsifying power for an oil-based raw material can be improved, and furthermore the decrease in the viscosity during addition of a water-miscible organic solvent can be suppressed.

The organic conceptual diagram is described in detail in, for example, "Organic Conceptual Diagram: Basics and Applications" (written by Yoshio KODA, SANKYO SHUPPAN Co., Ltd., 1984) and the like. The "organic conceptual diagram" is provided in the following manner: for all the organic compounds, two factors that are "organicity" attributable to the covalent bond chain in the carbon region and "inorganicity" due to electrostatic properties present in the substituent (functional group) are determined as numerical values in accordance with predetermined rules, and are plotted on a graph in which the organic value is plotted on the X axis and the inorganic value is plotted on the Y axis. The above-described literature states that the magnitude of an organic value in the organic conceptual diagram can be measured on the basis of the number of carbon atoms represented by a methylene group in the molecule of the organic compound, and further defines "The organic value of a single carbon atom serving as the basis is defined as 20 on the basis of the average increase of 20° C. in the boiling point of the organic compound having about 5 to about 10 carbon atoms due to addition of a single carbon atom. ". Thus, the monoamine (A) having, in the organic conceptual diagram, an organic value of 200 or more substantially means the same as a monoamine having 10 or more carbon atoms, and the monoamine (B) having an organic value of less than 200 means the same as a monoamine having less than 10 carbon atoms.

The monoamine (A) preferably has an organic value of 240 or more, more preferably 280 or more. The upper limit of the organic value of the monoamine (A) is not particularly limited, but is preferably 2000 or less, more preferably 1000 or less, or may be 500 or less.

The monoamine (B) preferably has an organic value of 180 or less. The monoamine (B) preferably has an organic value of 0 or more, more preferably 20 or more, still more preferably 60 or more.

The monoamine (A) having an organic value of 200 or more may be a long-chain alkylamine having 10 or more carbon atoms, more preferably 10 or more and 100 or less carbon atoms; examples include primary amines such as 1-aminoheptadecane, stearylamine, nonadecylamine, and 3-lauryloxypropylamine, secondary amines such as di(2-ethylhexyl)amine and N-methyloctadecylamine, tertiary amines such as N-lauryldiethanolamine, N,N-dimethylstearylamine, N,N-dimethyl-n-octylamine, trilaurylamine, stearyldiethanolamine, and N-methyldioctadecylamine, and quaternary ammoniums such as tetrabutylammonium hydroxide, tetrapropylammonium hydroxide, and benzyltriethylammonium hydroxide. These can be used alone or in combination of two or more thereof. Of these, from the viewpoint of improvement in the emulsification stability during addition of an oil-based raw material and skin irritation, at least one selected from the group consisting of N-lauryldiethanolamine, N, N-dimethylstearylamine, di(2-ethylhexyl)amine, N,N-dimethyl-n-octylamine, and trilaurylamine is preferably employed.

The monoamine (B) having an organic value of less than 200 may be a low-molecular-weight amine having 0 or more and less than 10 carbon atoms; examples include primary amines such as monoethanolamine, 2-amino-2-methylpropanol, 2-amino-2-methyl-1,3-propanediol, and monooctylamine, secondary amines such as diethanolamine, tertiary amines such as triethylamine, N,N-dimethylbutylamine, triethanolamine, dimethylbenzylamine, and triisopropanolamine, quaternary ammoniums such as tetramethylammonium hydroxide and tetraethylammonium hydroxide, and ammonia. These can be used alone or in combination of two or more thereof. Of these, from the viewpoint of improvement in the emulsification stability during addition of an oil-based raw material, improvement in the defibration efficiency, or skin irritation, at least one selected from the group consisting of triethanolamine, triisopropanolamine, 2-amino-2-methylpropanol, and ammonia is preferably employed.

In the anion-modified cellulose fiber, the contents of the monoamine (A) and the monoamine (B) are not particularly limited, and the total content of both may be 0.05 to 3.0 mmol/g, may be 0.5 to 2.8 mmol/g, or may be 0.6 to 2.5 mmol/g.

The molar ratio A/B of the monoamine (A) to the monoamine (B) is not particularly limited, but is preferably 0.1/99.9 to 80/20. When the molar ratio A/B is 0.1/99.9 or more, the affinity for an oil-based raw material can be improved to enhance the effect of improving the emulsification stability. When the molar ratio A/B is 80/20 or less, the defibration efficiency can be improved to enhance the effect of improving transparency and thickening performance. The molar ratio A/B is preferably 0.5/99.5 or more, more preferably 1/99 or more. The molar ratio A/B is preferably 50/50 or less, more preferably 30/70 or less, still more preferably 20/80 or less.

The anion-modified cellulose fiber used in this embodiment is preferably obtained by neutralizing an anion-modified cellulose fiber having acid-form anionic groups, using the monoamine (A) and the monoamine (B) so as to satisfy a pH in the range of 5 to 10. The pH is more preferably in the range of 6 to 8. The pH is a pH at 25° C.

The anion-modified cellulose fiber used in this embodiment is preferably an anion-modified cellulose nanofiber having a nanometer-level fiber diameter. Specifically, the anion-modified cellulose fiber has a cellulose I crystal structure, has a number-average fiber diameter of 0.6 to 200 nm, and has an average aspect ratio of 10 to 1000 preferably.

The cellulose I crystal structure is the crystalline form of natural cellulose. The cellulose I crystal structure can be identified on the basis of, in a diffraction profile obtained by wide-angle X-ray diffraction pattern measurement, typical peaks present at two positions of 2θ=about 14° to about 17° and 2θ=about 22° to about 23°.

The anion-modified cellulose fiber is not particularly limited in terms of degree of crystallinity, but the degree of crystallinity calculated using an X-ray diffraction apparatus by the Segal method is preferably, for example, 60% or more and 95% or less. The degree of crystallinity is more preferably 70% or more. The upper limit of the degree of crystallinity is not particularly limited, but may be, for example, 92% or less, or may be 90% or less.

When the anion-modified cellulose fiber has a number-average fiber diameter of 200 nm or less, transparency and thickening performance can be improved, and usability in the case of use as a skin external preparation can be improved. The number-average fiber diameter is more preferably 50 nm or less, still more preferably 30 nm or less, yet more preferably 10 nm or less, still yet more preferably 5 nm or less. The lower limit of the number-average fiber diameter may be 1 nm or more, or may be 1.5 nm or more.

The anion-modified cellulose fiber has an average aspect ratio of more preferably 50 or more, still more preferably 100 or more, or may be 200 or more. The average aspect ratio is more preferably 700 or less, or may be 500 or less. The average aspect ratio is a ratio of the number-average fiber length (nm) to the number-average fiber diameter (nm) of the anion-modified cellulose fiber (number-average fiber length/number-average fiber diameter).

The method for producing the anion-modified cellulose fiber according to this embodiment is not particularly limited. For example, after an anion-modified cellulose fiber having anionic groups is produced in accordance with a publicly known method, the anion-modified cellulose fiber can be subjected to a neutralization treatment using the monoamine (A) and the monoamine (B), to thereby obtain the anion-modified cellulose fiber in which anionic groups are salts of the monoamine (A) and the monoamine (B).

In an embodiment, in the case of obtaining an anion-modified cellulose nanofiber, after anionic groups are introduced into a cellulose raw material in accordance with a publicly known method, anionic groups of the resultant anion-modified cellulose fiber can be subjected to a neutralization treatment using the monoamine (A) and the monoamine (B), and subsequently to a segmentation (defibration) treatment, to thereby obtain an anion-modified cellulose nanofiber having the monoamine (A) and the monoamine (B) as counter ions.

In an embodiment, the anion-modified cellulose fiber having, as anionic groups, carboxy groups may be, for example, an oxidized cellulose fiber provided by oxidizing hydroxy groups of glucose units in a cellulose molecule, or a carboxymethylated cellulose fiber provided by carboxymethylating hydroxy groups of glucose units in a cellulose molecule.

For the oxidized cellulose fiber, in a cellulose molecule, hydroxy groups at the C6 positions of glucose units may be selectively oxidized and modified into carboxy groups. The oxidized cellulose fiber is obtained by subjecting natural cellulose such as wood pulp to oxidation in the presence of an N-oxyl compound, using a co-oxidizing agent, and to a segmentation treatment. As the N-oxyl compound, a compound having a nitrooxy radical and ordinarily used as an oxidation catalyst is used; the compound is, for example, a piperidine nitrooxyoxy radical, particularly preferably 2,2, 6,6-tetramethylpiperidinooxy radical (TEMPO) or 4-acetamide-TEMPO. In the method for producing the oxidized cellulose fiber, before the segmentation treatment, carboxy groups are preferably subjected to a neutralization treatment using the monoamine (A) and the monoamine (B).

The segmentation treatment can be performed by, for example, using a homomixer under high-speed rotation, a high-pressure homogenizer, an ultrasonic dispersion treatment machine, a beater, a disk-type refiner, a conical-type refiner, a double-disk-type refiner, a grinder, or the like to treat a dispersion liquid of the anion-modified cellulose fiber.

[Viscous Aqueous Composition]

The viscous aqueous composition according to this embodiment includes the above-described specific anion-modified cellulose fiber and water. The anion-modified cellulose fiber content is not particularly limited, but is preferably 0.01 to 10 mass %, more preferably 0.05 to 5.0 mass %, or may be 0.1 to 3.0 mass %. The water content is not particularly limited, but may be, for example, 30 mass % or more, may be 50 mass % or more, may be 80 mass % or more, may be 90 mass % or more, may be 95 mass % or more, or may be 99.99 mass % or less, or may be 99.95 mass % or less.

The viscosity of the viscous aqueous composition varies depending on the concentration, the application, or the like and hence is not particularly limited; however, the viscosity at a liquid temperature of 25° C. is preferably 1000 mPa·s or more, more preferably 3000 mPa·s or more. The upper limit of the viscosity is not particularly limited, but may be, for example, 80000 mPa·s or less, may be 50000 mPa·s or less, or may be 30000 mPa·s or less. In an embodiment, in a viscous aqueous composition that is prepared so as to have an anion-modified cellulose fiber content of 0.2 mass %, the viscosity at a liquid temperature of 25° C. is preferably in such a numerical range; specifically, preferably, the lower limit is 1000 mPa·s or more, or 3000 mPa·s or more, and the upper limit is 80000 mPa·s or less, 50000 mPa·s or less, or 30000 mPa·s or less. The viscosity used herein is a value measured using a BM-type viscometer at a rotor rotation rate of 0.6 rpm.

The viscous aqueous composition may contain, in addition to the above-described specific anion-modified cellulose fiber (component a) and water (component b), another component. The other component is not particularly limited, and examples include inorganic salts, organic salts, oil-based raw materials, surfactants, humectants, preservatives, organic fine particles, inorganic fine particles, deodorants, perfumes, and organic solvents. These can be used alone or in combination of two or more thereof.

[Emulsion Composition]

An emulsion composition according to an embodiment includes the above-described viscous aqueous composition and an oil-based raw material. The above-described viscous aqueous composition has emulsifying power for an oil-based raw material, and hence can be used as an emulsifier. Thus, an emulsion composition according to an embodiment is prepared by using the above-described viscous aqueous composition to emulsify an oil-based raw material, and includes the above-described specific anion-modified cellulose fiber (component a), water (component b), and an oil-based raw material (component c). The emulsion composition may be a viscous composition having a viscosity equal to or similar to that of the above-described viscous aqueous composition, or may be a liquid composition having a viscosity equal to or similar to that of water.

The emulsion composition may be an oil in water (O/W) emulsion in which oil droplets are dispersed in water, or a water in oil (W/O) emulsion in which water droplets are dispersed in oil, but is preferably an oil in water emulsion composition in which an oil-based raw material is emulsified in water.

In the emulsion composition, the anion-modified cellulose fiber content is not particularly limited. In the emulsion composition, the concentration of the anion-modified cellulose fiber included in the water phase (specifically, the concentration of the anion-modified cellulose fiber in the aqueous dispersion liquid mixed with an oil-based raw material during preparation of the emulsion composition) may be, for example, 0.0001 to 5 mass %, may be 0.001 to 3 mass %, or may be 0.01 to 1 mass %.

In the emulsion composition, the water phase may be formed of the above-described viscous aqueous composition alone, or may be prepared by diluting the viscous aqueous composition in an aqueous solvent such as water. In the emulsion composition, the water phase may include, in addition to the above-described specific anion-modified cellulose fiber and water, for example, various water-soluble components including monohydric alcohols such as ethanol, polyhydric alcohols such as propylene glycol and butylene glycol, saccharides such as monosaccharides and oligosaccharides, inorganic salts such as NaCl, KCl, $CaCl_2$, $MgCl_2$, $(NH_4)_2SO_4$, and $Na_2CO_3$, and organic salts.

In the emulsion composition, the oil-based raw material content is not particularly limited. For example, the volume ratio (oil phase/water phase) of an oil phase formed of the oil-based raw material to a water phase including the anion-modified cellulose fiber may be 1/100 to 10/1, may be 1/20 to 7/1, or may be 1/10 to 1/1.

In the emulsion composition, the oil-based raw material constituting the oil phase may be various liquids that separate from water; examples include silicone oils, vegetable oils and fats, animal oils and fats, waxes, hydrocarbons, higher fatty acids, higher alcohols, ester oils, and aromatic alcohols. These may be used alone or in combination of two or more thereof.

Examples of the silicone oils include methylpolysiloxane (synonym: dimeticone), crosslinked methylpolysiloxane, cyclic silicones (for example, cyclic polysiloxanes such as cyclopentasiloxane), alkyl-modified silicones, amino-modified silicones, polyether-modified silicones, polyglycerol-modified silicones, acrylic silicones, and phenyl-modified silicones.

Examples of the vegetable oils and fats include avocado oil, almond oil, olive oil, candlenut oil, grapeseed oil, sesame oil, wheat germ oil, rice germ oil, rice bran oil, safflower oil, shea butter, soybean oil, tea seed oil (*Camellia sinensis* seed oil, *Camellia sinensis* seed oil), evening primrose oil, *Camellia japonica* seed oil, corn germ oil, rapeseed oil, persic oil, *Coix lacryma-jobi* ma-yuen seed oil, palm oil, palm kernel oil, castor oil, hydrogenated castor oil, sunflower oil, hazelnut oil, macadamia nut oil, meadowfoam seed oil, cotton seed oil, Japan wax, coconut oil, peanut oil, and rose hip oil.

Examples of the animal oils and fats include fish oil, beef tallow, turtle oil, mink oil, and egg yolk oil.

Examples of the waxes include carnauba wax, spermaceti, shellac, jojoba oil, beeswax, white beeswax, montan wax, lanoline, lanoline derivatives, reduced lanoline, hard lanoline, and adsorption refined lanoline.

Examples of the hydrocarbons include α-olefin oligomers, squalane, squalene, ceresin, paraffin wax, pristane, polyethylene powder, microcrystalline wax, liquid paraffin, vaseline, mineral oils, and linear alkanes having 8 to 30 carbon atoms (for example, hexadecane).

Examples of the higher fatty acids include arachidonic acid, isostearic acid, undecylenic acid, oleic acid, stearic acid, palmitic acid, behenic acid, myristic acid, lauric acid, lanoline fatty acid, hard lanoline fatty acid, soft lanoline fatty acid, linoleic acid, and linolenic acid.

Examples of the higher alcohols include isostearyl alcohol, oleyl alcohol, octyldodecanol, chimyl alcohol, cholesterol, sitosterol, stearyl alcohol, cetanol, cetostearyl alcohol, selachyl alcohol, decyltetradecanol, batyl alcohol, phytosterol, hexyldecanol, behenyl alcohol, lauryl alcohol, lanoline alcohol, and hydrogenated lanoline alcohol.

Examples of the ester oils include fatty acid esters such as lanoline acetate, isocetyl isostearate, cholesteryl isostearate, octyldodecyl erucate, cetyl ethylhexanoate, cetostearyl ethylhexanoate, octyldodecyl oleate, decyl oleate, hexyldecyl dimethyloctanoate, isocetyl stearate, cholesteryl stearate, butyl stearate, isopropyl palmitate, isotridecyl myristate, isopropyl myristate, octyldodecyl myristate, myristyl myristate, hexyl laurate, isopropyl lanolate, cholesteryl lanolate, and methyl decanate, hydroxy acid esters such as cetyl lactate, myristyl lactate, cholesterol hydroxystearate, and diisostearyl malate, triglycerides such as glycerol trimyristate and glyceryl tri(caprylate/caprate), and methoxycinnamates such as ethylhexyl methoxycinnamate.

Examples of the aromatic alcohols include benzyl alcohol and phenethyl alcohol.

Of these, an oil-based raw material having an I/O balance of 1.00 or less is preferably employed, more preferably an oil-based raw material having an I/O balance of 0.45 or less is employed. The I/O balance is a parameter serving as an index of the degree of hydrophilicity-hydrophobicity of a compound, and is determined by dividing the inorganic value (I) by the organic value (O). The higher the I/O balance, the higher the polarity (hydrophilicity, inorganicity); the lower the I/O balance, the higher the nonpolarity (hydrophobicity, organicity). The I/O balance is described in "Organic Conceptual Diagram: Basics and Applications" (written by Yoshio KODA, SANKYO SHUPPAN Co., Ltd., 1984).

To the emulsion composition, in addition to the above-described components, as needed, additives can be appropriately added, such as powders that are insoluble in the water phase and the oil phase (for example, inorganic powders such as talc, kaolin, and mica, and organic powders such as polyamide resin powders), antioxidants, ultraviolet absorbents, pigments, dyes, perfumes, lubricants, plasticizers, and storage stabilizers.

In the preparation of the emulsion composition, the emulsification method is not particularly limited, and any publicly known method can be employed such as forced emulsification method, phase inversion emulsification method, D phase emulsification method, or gel emulsification method; various devices can be used: for example, stirring using a single device such as an impeller, a disper, or a homogenizer, or stirring using a plurality of such devices in combination.

Applications of the emulsion composition are not particularly limited and it is applicable to, for example, various products having the form of cream, gel, milky lotion, or liquid (such as cosmetics, pharmaceuticals for external use, quasi-drugs, agricultural chemicals, toiletries, spray products, and paints). Specific examples of the applications include skin cosmetics such as toilet lotions, milky lotions, cold creams, vanishing creams, massage creams, emollient creams, cleansing creams, liquid foundations, packs, foundations, sunscreen cosmetics, suntan cosmetics, moisture creams, hand creams, skin-whitening milky lotions, and various lotions; hair cosmetics such as shampoos, rinses, hair conditioners, conditioning shampoos, hair styling agents (such as hair foams and gel-type hair dressings), hair treatment agents (such as hair creams and treatment lotions), hair dyes, and lotion-type hair restorers or hair tonics; cleaning agents such as hand cleaners, preshave lotions, aftershave lotions, air fresheners for automobiles or rooms, deodorants, dentifrices, ointments, patches, agricultural chemicals, spray products, and paints. Of these, preferred is use as skin external preparations such as cosmetics, pharmaceuticals for external use, and quasi-drugs.

[Solvent-Containing Viscous Composition]

A solvent-containing viscous composition according to an embodiment is a viscous composition that is prepared by mixing the above-described viscous aqueous composition with a water-miscible organic solvent, and has a water-miscible organic solvent content of 10 to 95 mass %. The viscous aqueous composition enables, even in the case of adding a water-miscible organic solvent such as alcohol, suppression of the decrease in the viscosity, so that it can be used as a thickener for such solvent-containing preparations. Thus, a solvent-containing viscous composition according to an embodiment is prepared by mixing the above-described viscous aqueous composition with a water-miscible organic solvent, and includes the above-described specific anion-modified cellulose fiber (component a), water (component b), and a water-miscible organic solvent (component d). The solvent-containing viscous composition preferably includes the water-miscible organic solvent without separation from water.

In the solvent-containing viscous composition, the water-miscible organic solvent content is 10 mass % or more, more preferably 40 mass % or more. The upper limit of the water-miscible organic solvent content is, from the viewpoint of maintaining a strong viscosity retention effect, 95 mass % or less, more preferably 90 mass % or less, still more preferably 80 mass % or less.

In the solvent-containing viscous composition, the anion-modified cellulose fiber content is not particularly limited, and may be, for example, 0.01 to 10 mass %, may be 0.05 to 5.0 mass %, or may be 0.1 to 1.0 mass %. The water content is not particularly limited, and may be, for example, 4.9 to 89.9 mass %, may be 9.9 to 59.9 mass %, or may be 19.9 to 59.9 mass %.

The viscosity of the solvent-containing viscous composition varies depending on the concentration, the application, or the like and hence is not particularly limited; however, the viscosity at a liquid temperature of 25° C. is preferably 5 mPa·s or more, more preferably 100 mPa·s or more, still more preferably 1000 mPa·s or more. The upper limit of the viscosity is not particularly limited, but may be, for example, 30000 mPa·s or less, or may be 20000 mPa·s or less. The viscosity used herein is a value measured using a BM-type viscometer at a rotor rotation rate of 6 rpm.

The water-miscible organic solvent refers to an organic solvent that dissolves, in an amount of 112 g or more, in 1 L of ion-exchanged water at 25° C., and is not particularly limited; specific examples include alcohols, amines, and other polar solvents. Examples of the alcohols include monohydric alcohols such as methanol, ethanol, propanol, and isopropanol; dihydric alcohols such as ethylene glycol, diethylene glycol, thiodiethylene glycol, triethylene glycol, tetraethylene glycol, polyethylene glycol, 2-methyl-1,3-propanediol, 2-ethyl-1,3-propanediol, 3-methoxy-1,2-propanediol, 2-butene-1,4-diol, 1,3-butanediol, 2-methyl-1,4-butanediol, dipropylene glycol, polypropylene glycol, 2-methyl-2,4-pentanediol, 1,5-pentanediol, 1,4-pentanediol, 1,3-pentanediol, 1,2-pentanediol, 3-methyl-1,3-pentanediol, 2,4-diethyl-1,5-pentanediol, 1,2-hexanediol, and 3,6-dithia-1,8-octanediol; tri- or higher valent polyhydric alcohols such as glycerol, hexanetriol, and trimethylolpropane; and glycerol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, propylene glycol monomethyl ether, propylene glycol monobutyl ether, dipropylene glycol monomethyl ether, triethylene glycol monomethyl ether, polyethylene glycol monomethyl ether, ethylene glycol monoisopropyl ether, triethylene glycol monobutyl ether, ethylene glycol monoisobutyl ether, diethylene glycol monoisobutyl ether, propylene glycol monopropyl ether, triethylene glycol monomethyl ether, triethylene glycol monoethyl ether, and ethylene glycol monophenyl ether. Examples of the amines include ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine. Examples of the other polar solvents include formamide, N,N-dimethylformamide, N,N-dimethylacetamide, dimethyl sulfoxide, sulfolane, 3-methylsulfolane, 3-sulfolene, bis(2-hydroxyethyl) sulfone, 2-pyrrolidone, N-methyl-2-pyrrolidone, N-vinyl-2-pyrrolidone, 2-pyrrolidone-5-carboxylic acid, 2-oxazolidone, 1,3-dimethyl-2-imidazolidinone, acetonitrile, acetone, diacetone alcohol, 4-picoline, ethylene glycol diacetate, and ethylene glycol monomethyl ether acetate. These may be used alone or in combination of two or more thereof.

Of these, the water-miscible organic solvent is preferably an alcohol and may specifically be at least one selected from the group consisting of methanol, ethanol, propanol, isopropanol, ethylene glycol, diethylene glycol, polyethylene glycol, 2-methyl-1,3-propanediol, 2-ethyl-1,3-propanediol, 3-methoxy-1,2-propanediol, 2-butene-1,4-diol, 1,3-butanediol, 2-methyl-1,4-butanediol, 2-methyl-2,4-pentanediol, 1,5-pentanediol, 1,4-pentanediol, 1,3-pentanediol, 1,2-pentanediol, 3-methyl-1,3-pentanediol, 2,4-diethyl-1,5-pentanediol, and glycerol.

To the solvent-containing viscous composition, in addition to the above-described components, as needed, for example, additives can be appropriately added, such as oil-based raw materials, inorganic salts, organic salts, surfactants, antioxidants, ultraviolet absorbents, pigments, dyes, perfumes, preservatives, organic powders, inorganic powders, and deodorants.

Applications of the solvent-containing viscous composition are not particularly limited and it is applicable to, for example, various products having the form of cream or gel (such as cosmetics, pharmaceuticals for external use, quasi-drugs, agricultural chemicals, toiletries, spray products, and paints). Specific examples of the applications include skin cosmetics such as cold creams, vanishing creams, massage creams, emollient creams, cleansing creams, packs, foundations, sunscreen cosmetics, suntan cosmetics, moisture creams, and hand creams; hair cosmetics such as shampoos, rinses, hair conditioners, conditioning shampoos, hair styling agents (such as hair foams and gel-type hair dressings), hair treatment agents (such as hair creams and treatment lotions), hair dyes, hair restorers, and hair tonics; cleaning agents such as hand cleaners, air fresheners for automobiles or rooms, deodorants, dentifrices, ointments, patches, agricultural chemicals, and paints. Of these, preferred is use as skin external preparations such as cosmetics, pharmaceuticals for external use, and quasi-drugs.

EXAMPLES

Hereinafter, Examples will be described in detail together with Comparative Examples. However, the present invention is not limited to these Examples.

[Preparation of Anion-Modified Cellulose Fiber]

Production Example 1

To 2.0 g of softwood kraft pulp, 150 mL of water, 0.25 g of sodium bromide, and 0.025 g of 2,2,6,6-tetramethylpiperidinooxy radical (TEMPO) were added and sufficiently stirred; subsequently, a 13 mass % aqueous sodium hypochlorite solution was added such that the amount of sodium hypochlorite relative to 1.0 g of the pulp became 12 mmol/g, to start a reaction. Furthermore, while a 0.5 N aqueous sodium hydroxide solution was added dropwise such that the pH during the reaction was kept at 10 to 11, the reaction was caused for 120 minutes. After the reaction, 0.1 N hydrochloric acid was added to reach pH=2.0, and dehydration was performed. To this, pure water was added to perform dilution to a cellulose fiber concentration of 2 mass %; as a neutralization step, relative to the amount of carboxyl groups of the oxidized cellulose fiber, 10 mass % sodium hydroxide (neutralization salt species B) was added in an amount of 50 mol %, and subsequently N-lauryldiethanolamine (neutralization salt species A) was added to adjust the pH to 7. Subsequently, as a segmentation treatment step, a treatment using a microfluidizer (150 MPa, 1 pass) was performed, to thereby obtain a 2 mass % aqueous dispersion liquid of anion-modified cellulose nanofiber as Cellulose fiber a1.

Production Examples 2 to 11

The same production method as in Production Example 1 was performed to obtain Cellulose fibers a2 to 11 except that, in the neutralization step, the neutralization salt species A being, instead of N-lauryldiethanolamine (LDEA), N,N-dimethylstearylamine (DMSA), di(2-ethylhexyl)amine (DEHA), or trilaurylamine (TLA), and the neutralization salt species B being, instead of 10 mass % sodium hydroxide (Na), 2-amino-2-methyl-1-propanol (AMP), triisopropanolamine (TIPA), triethanolamine (TEA), or 28 mass % aqueous ammonia (NH$_4$) were added so as to satisfy, relative to the amount of carboxyl groups of oxidized cellulose fiber, a ratio A/B described in Table 1 below.

Production Example 12

The same production method as in Production Example 1 was performed to obtain Cellulose fiber a12 except that, in the neutralization step, instead of 10 mass % sodium hydroxide and N-lauryldiethanolamine, 2-amino-2-methyl-1-propanol (AMP) alone was used to perform neutralization.

Production Example 13

The same production method as in Production Example 1 was performed to try to prepare Cellulose fiber a13 except that, in the neutralization step, instead of 10 mass % sodium hydroxide, N-lauryldiethanolamine (LDEA) alone was used to perform neutralization. However, Cellulose fiber a13 became hydrophobic due to neutralization using LDEA alone, and hence aggregated in water and was not defibrated.

(Organic Value)

In the above-described Production Examples, the monoamines used as neutralization salts have the following organic values.

"Neutralization salt species A"
N-lauryldiethanolamine (LDEA): 320
trilaurylamine (TLA): 720
N,N-dimethylstearylamine (DMSA): 400
di(2-ethylhexyl)amine (DEHA): 300
"Neutralization salt species B"
triethanolamine (TEA): 120
2-amino-2-methyl-1-propanol (AMP): 80
triisopropanolamine (TIPA): 180
ammonia (NH$_4$): 0

(Evaluations)

Cellulose fibers a1 to 12 obtained in Production Examples 1 to 12 were measured in terms of degree of crystallinity, number-average fiber diameter, average aspect ratio, and anionic group content. Cellulose fibers a1 to 12 were viscous aqueous compositions containing an anion-modified cellulose fiber and water, and the viscous aqueous compositions were measured in terms of transparency and viscosity. The method of measuring the anionic group (carboxy group) content has been described above; the methods of measuring degree of crystallinity, number-average fiber diameter, average aspect ratio, transparency, and viscosity will be described below. The results will be described in Table 1 below.

(1) Degree of Crystallinity (%)

The X-ray diffraction intensity of such a cellulose fiber was measured by the X-ray diffraction method; from the measurement result, the Segal method was used to perform calculation by the following Formula (1).

$$\text{Cellulose } I \text{ degree of crystallinity (\%)} = [(I_{22.6} - I_{18.5})/I_{22.6}] \times 100 \quad (1)$$

In Formula (1), $I_{22.6}$ represents the diffraction intensity of a lattice plane (200) (diffraction angle $2\theta=22.6°$) in X-ray diffraction, and $I_{18.5}$ represents the diffraction intensity of an amorphous region (diffraction angle $2\theta=18.5°$). The sample was measured in terms of X-ray diffraction intensity using "RINT2200" manufactured by Rigaku Corporation under the following conditions.

X-ray source: Cu/Kα-radiation
Tube voltage: 40 Kv
Tube current: 30 mA
Measurement range: diffraction angle $2\theta=5$ to $35°$
X-ray scanning speed: 10°/min (2) Number-Average Fiber Diameter and Average Aspect Ratio For 50 cellulose fibers randomly selected in image observation using an atomic force microscope (AFM), fiber diameters and fiber lengths were individually arithmetically averaged to calculate the number-average fiber diameter (nm) and the number-average fiber length (nm). The ratio of the number-average fiber length to the number-average fiber diameter (number-average fiber length/number-average fiber diameter) was calculated to determine the average aspect ratio.

(3) Transparency

From each of the 2 mass % cellulose fiber aqueous dispersion liquids obtained in Production Examples 1 to 12, 10 g of the liquid was sampled, mixed with 190.0 mL of water, stirred using a homomixer MARK II model 2.5 manufactured by PRIMIX Corporation at 8,000 rpm for 10 minutes, and subsequently degassed, to thereby prepare a diluted solution having a cellulose fiber concentration of 0.1 mass %. The obtained diluted solution was left at rest at room temperature overnight, subsequently transferred into a polystyrene disposable cell having an optical path length of 10 mm, and measured using an UV-visible spectrophotometer in terms of transmittance at a wavelength of 660 nm.

(4) Viscosity

From each of the 2 mass % cellulose fiber aqueous dispersion liquids obtained in Production Examples 1 to 12, 20 g of the liquid was sampled, mixed with 180.0 mL of water, and stirred using a homomixer MARK II model 2.5 manufactured by PRIMIX Corporation at 8,000 rpm for 10 minutes, to thereby prepare a diluted solution having a cellulose fiber concentration of 0.2 mass %. The obtained diluted solution was degassed, transferred into a 100 mL sample vial, left at rest at room temperature overnight, and subsequently measured using a BM-type viscometer (0.6 rpm, 25° C., 3 min) in terms of viscosity.

TABLE 1

| | Production Example 1 | Production Example 2 | Production Example 3 | Production Example 4 | Production Example 5 | Production Example 6 | Production Example 7 |
|---|---|---|---|---|---|---|---|
| Cellulose species | a1 | a2 | a3 | a4 | a5 | a6 | a7 |
| Degree of crystallinity (%) | 87 | 88 | 86 | 85 | 84 | 87 | 88 |
| Neutralization salt  Species A | LDEA | LDEA | LDEA | LDEA | LDEA | LDEA | LDEA |
| Species B | Na | AMP | TEA | AMP | TIPA | $NH_4$ | AMP |
| A/B (molar ratio) | 50/50 | 50/50 | 10/90 | 10/90 | 10/90 | 10/90 | 5/95 |
| Number-average fiber diameter (nm) | 5.8 | 2.1 | 1.9 | 1.9 | 2.0 | 2.4 | 3.1 |
| Average aspect ratio | 207 | 382 | 421 | 418 | 415 | 354 | 380 |
| Anionic group content (mmol/g) | 2.2 | 2.2 | 2.2 | 2.2 | 2.2 | 2.1 | 2.2 |
| Transparency (%) | 15 | 43 | 86 | 84 | 85 | 83 | 95 |
| Viscosity (mPa·s) | 2,120 | 8,075 | 20,500 | 19,375 | 20,275 | 18,270 | 24,350 |

| | Production Example 8 | Production Example 9 | Production Example 10 | Production Example 11 | Production Example 12 | Production Example 13 |
|---|---|---|---|---|---|---|
| Cellulose species | a8 | a9 | a10 | a11 | a12 | a13 |
| Degree of crystallinity (%) | 89 | 82 | 88 | 85 | 86 | — |
| Neutralization salt  Species A | LDEA | TLA | DMSA | DEHA | — | LDEA |
| Species B | AMP | AMP | AMP | AMP | AMP | — |
| A/B (molar ratio) | 1/99 | 1/99 | 5/95 | 5/95 | — | — |
| Number-average fiber diameter (nm) | 2.1 | 4.3 | 2.2 | 2.0 | 1.8 | — |
| Average aspect ratio | 379 | 198 | 366 | 410 | 444 | — |
| Anionic group content (mmol/g) | 2.2 | 2.2 | 2.2 | 2.2 | 2.2 | 2.2 |
| Transparency (%) | 96 | 78 | 95 | 94 | 98 | — |
| Viscosity (mPa·s) | 26,375 | 19,480 | 25,500 | 24,670 | 23,475 | — |

As described in Table 1, in Production Example 1 according to a comparative example using, as neutralization salts, Species A being LDEA and Species B being sodium, compared with other Production Examples, the number-average fiber diameter was large, which resulted in low transparency and low viscosity. In Production Example 13 according to comparative example using, as the neutralization salt, Species A being LDEA alone, cellulose fibers aggregated in water and were not defibrated.

[Preparation of Emulsion Liquids]

Subsequently, Cellulose fibers a1 to 12 obtained by the above-described production methods were used to prepare emulsion liquids (emulsion compositions).

Example 1

From Cellulose fiber a2 (2 mass % aqueous dispersion liquid) obtained in Production Example 2, 5.0 g of the liquid was weighed out, mixed with 195.0 mL of water, stirred using a homomixer MARK II model 2.5 manufactured by PRIMIX Corporation at 8,000 rpm for 10 minutes, and subsequently degassed, to thereby prepare a diluted solution having a cellulose fiber concentration of 0.05 mass %. From the diluted solution having a cellulose fiber concentration of 0.05 mass %, 20 mL of the solution was weighed out, mixed with 5 mL of dimeticone (I/O balance=0.30), and subjected to, using an ultrasonic homogenizer VC505 manufactured by Sonics & Materials, Inc., ultrasonic radiation for 1 minute to thereby prepare an oil in water emulsion liquid.

Examples 2 to 23

The same procedures as in Example 1 were performed to prepare emulsion liquids except that Cellulose fibers a2 to 11 obtained in Production Examples 2 to 11 and oils were used so as to perform dilution to cellulose fiber concentrations in Table 2 below, and they were used so as to perform formulation satisfying formulation ratios in Table 2.

Comparative Examples 1 to 2

The same procedures as in Example 1 were performed to prepare emulsion liquids except that, as described in Table 3 below, Celluloses a1 and a12 obtained in Production Examples 1 and 12 were used so as to be diluted to a cellulose fiber concentration of 0.05 mass %, and the resultant diluted solutions were used.

(Evaluations)

Examples 1 to 23 and Comparative Examples 1 to 2 were evaluated in terms of emulsifying power and usability. Evaluation methods will be described below. The results will be described in Table 2 and Table 3.

(Emulsifying Power)

Such an emulsion liquid was transferred into a test tube having a volume of 25 mL, and left at rest for 1 week. Subsequently, the emulsion state was visually observed to evaluate the emulsifying power.

Good: oil phases are scarcely formed and emulsion phases are formed

Average: some oil phases remain, but emulsion phases are formed

Poor: emulsion phases are not formed (Usability)

The emulsion liquid was applied to the upper arm and dried and subsequently the texture was subjected to sensory evaluation in accordance with grades below. The result of usability was described as the average of values determined by 3 assessors in our company.

3 points: spreads well and does not cause tight feeling
1 point: spreads poorly or causes tight feeling
0 points: spreads poorly and causes tight feeling

TABLE 2

| | | Example 1 | Example 2 | Example 3 | Example 4 | Example 5 | Example 6 | Example 7 | Example 8 |
|---|---|---|---|---|---|---|---|---|---|
| Cellulose fiber | Cellulose species | a2 | a3 | a4 | a5 | a6 | a7 | a8 | a9 |
| | Concentration (mass %) | 0.05 | 0.05 | 0.05 | 0.05 | 0.05 | 0.05 | 0.05 | 0.05 |
| Oil | Species | c1 | c1 | c1 | c1 | c1 | c1 | c1 | c1 |
| | I/O balance | 0.30 | 0.30 | 0.30 | 0.30 | 0.30 | 0.30 | 0.30 | 0.30 |
| Oil/cellulose dispersion liquid (v/v) | | 0.25 | 0.25 | 0.25 | 0.25 | 0.25 | 0.25 | 0.25 | 0.25 |
| Emulsifying power | | Good | Good | Good | Good | Average | Good | Good | Good |
| Usability | | 1.7 | 2.3 | 3 | 3 | 3 | 3 | 3 | 1.3 |

| | | Example 9 | Example 10 | Example 11 | Example 12 | Example 13 | Example 14 | Example 15 | Example 16 |
|---|---|---|---|---|---|---|---|---|---|
| Cellulose fiber | Cellulose species | a10 | a11 | a2 | a2 | a2 | a2 | a2 | a2 |
| | Concentration (mass %) | 0.05 | 0.05 | 0.05 | 0.05 | 0.05 | 0.05 | 0.05 | 0.05 |
| Oil | Species | c1 | c1 | c2 | c3 | c4 | c5 | c6 | c7 |
| | I/O balance | 0.30 | 0.30 | 0.00 | 0.00 | 0.34 | 0.44 | 0.33 | 0.82 |
| Oil/cellulose dispersion liquid (v/v) | | 0.25 | 0.25 | 0.25 | 0.25 | 0.25 | 0.25 | 0.25 | 0.25 |
| Emulsifying power | | Good | Good | Good | Good | Good | Good | Good | Average |
| Usability | | 3 | 2.3 | 1.7 | 1.7 | 1.7 | 1.7 | 1.7 | 1.7 |

| | | Example 17 | Example 18 | Example 19 | Example 20 | Example 21 | Example 22 | Example 23 |
|---|---|---|---|---|---|---|---|---|
| Cellulose fiber | Cellulose species | a7 | a7 | a7 | a7 | a7 | a7 | a7 |
| | Concentration (mass %) | 0.001 | 0.01 | 0.1 | 0.5 | 0.1 | 0.1 | 0.1 |

TABLE 2-continued

| Oil | Species | c1 | c1 | c1 | c1 | c1 | c1 | c1 |
|---|---|---|---|---|---|---|---|---|
| | I/O balance | 0.30 | 0.30 | 0.30 | 0.30 | 0.30 | 0.30 | 0.30 |
| Oil/cellulose dispersion liquid (v/v) | | 0.25 | 0.25 | 0.25 | 0.25 | 0.05 | 5 | 7 |
| Emulsifying power | | Average | Good | Good | Good | Good | Good | Average |
| Usability | | 3 | 3 | 3 | 3 | 3 | 3 | 2.3 |

TABLE 3

| | | Comparative Example 1 | Comparative Example 2 |
|---|---|---|---|
| Cellulose fiber | Cellulose species | a12 | a1 |
| | Concentration (mass %) | 0.05 | 0.05 |
| Oil | Species | c1 | c1 |
| | I/O balance | 0.30 | 0.30 |
| Oil/cellulose dispersion liquid (v/v) | | 0.25 | 0.25 |
| Emulsifying power | | Poor | Good |
| Usability | | 2.3 | 0 |

In Tables 2 and 3, c1 to c7 are as follows.
c1: dimeticone
c2: squalane
c3: mineral oil
c4: ethylhexyl methoxycinnamate
c5: cyclopentasiloxane
c6: glyceryl tri (caprylate/caprate)
c7: benzyl alcohol As described in Table 3, Comparative Example 1, which was Cellulose fiber a12 prepared by neutralization using the monoamine (B) being low-molecular-weight amine AMP alone, had a low affinity for oil and low emulsifying power. Comparative Example 2, which was Cellulose fiber a1 prepared by neutralization using the monoamine (A) being long-chain alkylamine LDEA and sodium in combination, became less likely to be defibrated than in the case of using the monoamine (A) and the monoamine (B) in combination, which resulted in the large fiber diameter and poor usability.

By contrast, as described in Table 2, in the case of the emulsion liquids prepared by emulsification using Cellulose fibers a2 to 11 according to embodiments prepared by neutralization using the monoamine (A) and the monoamine (B) in combination, compared with Comparative Example 1, high emulsifying power was achieved; in particular, in the case where the cellulose fiber concentration was 0.001 mass % or more, the volume ratio of oil/cellulose dispersion liquid was 7 or less, and the oil had an I/O balance of 1.00 or less, high emulsifying power was achieved. This was inferentially because the combined use of the monoamine (B) being a low-molecular-weight amine and the monoamine (A) being a long-chain alkylamine also enhanced the affinity for the oil. In addition, use of a low-molecular-weight amine facilitated defibration in water, so that the fibers were defibrated to single nanofibers, which resulted in high usability, compared with Comparative Example 2.

[Preparation of Alcohol-Containing Preparations]

Subsequently, Cellulose fibers a1 to 12 obtained by the above-described production methods were used to prepare alcohol-containing preparations (solvent-containing viscous compositions).

Example 24

From Cellulose fiber a2 (2 mass % aqueous dispersion liquid) obtained in Production Example 2, 40 g of the liquid was weighed out, mixed with 40 g of water and 120 g of ethanol, stirred using a homomixer MARK II model 2.5 manufactured by PRIMIX Corporation at 8,000 rpm for 10 minutes, and subsequently degassed to thereby prepare an alcohol-containing preparation having a cellulose fiber concentration of 0.4 mass % and an ethanol content of 60%.

In addition, 40 g of Cellulose fiber a2 was weighed out, mixed with 160 g of water, stirred using a homomixer MARK II model 2.5 manufactured by PRIMIX Corporation at 8,000 rpm for 10 minutes, and subsequently degassed, to prepare an alcohol-free preparation. Such dispersion liquids were each transferred into a 100 mL screw top vial, left at rest for 1 day, and subsequently measured using a BM-type viscometer at 6 rpm for 3 minutes to determine the viscosity.

The determined viscosity of the alcohol-containing preparation and the determined viscosity of the alcohol-free preparation were used to determine, by the following Formula (2), a viscosity retention ratio.

$$\text{Viscosity retention ratio [\%]} = (\text{viscosity of alcohol-containing preparation})/(\text{viscosity of alcohol-free preparation}) \times 100 \quad (2)$$

Examples 25 to 43

The same procedures as in Example 24 were performed to prepare alcohol-containing preparations and alcohol-free preparations and to determine the viscosity retention ratios except that Cellulose fibers a2 to 11 obtained in Production Examples 2 to 11 and alcohols were used to perform formulation so as to satisfy cellulose concentrations and formulation ratios in Table 4 below.

Comparative Examples 3 to 4

As described in Table 5 below, the same procedures as in Example 24 were performed to prepare alcohol-containing preparations and alcohol-free preparations and to determine the viscosity retention ratios except that Cellulose fibers a1 and a12 obtained in Production Examples 1 and 12 were used, dilution to a cellulose concentration of 0.4 mass % was performed, and the resultant diluted solutions were used.

Comparative Example 5

As described in Table 5 below, formulation using water and an alcohol was performed without using cellulose fiber, and the viscosity was measured as in Example 24.

TABLE 4

|  |  | Example 24 | Example 25 | Example 26 | Example 27 | Example 28 | Example 29 | Example 30 |
|---|---|---|---|---|---|---|---|---|
| Cellulose fiber | Cellulose species | a2 | a3 | a4 | a5 | a6 | a7 | a8 |
|  | Concentration (mass %) | 0.4 | 0.4 | 0.4 | 0.4 | 0.4 | 0.4 | 0.4 |
| Alcohol | Species | d1 | d1 | d1 | d1 | d1 | d1 | d1 |
|  | Concentration (mass %) | 60 | 60 | 60 | 60 | 60 | 60 | 60 |
| Viscosity of alcohol-containing preparation (mPa · s) |  | 1,010 | 6,200 | 6,180 | 6,530 | 5,860 | 6,750 | 6,380 |
| Viscosity retention ratio (%) |  | 72 | 61 | 65 | 78 | 63 | 58 | 55 |

|  |  | Example 31 | Example 32 | Example 33 | Example 34 | Example 35 | Example 36 | Example 37 |
|---|---|---|---|---|---|---|---|---|
| Cellulose fiber | Cellulose species | a9 | a10 | a11 | a5 | a5 | a5 | a5 |
|  | Concentration (mass %) | 0.4 | 0.4 | 0.4 | 0.4 | 0.4 | 0.4 | 0.4 |
| Alcohol | Species | d1 | d1 | d1 | d2 | d3 | d4 | d5 |
|  | Concentration (mass %) | 60 | 60 | 60 | 60 | 60 | 60 | 60 |
| Viscosity of alcohol-containing preparation (mPa · s) |  | 5,710 | 6,800 | 6,640 | 6,780 | 6,450 | 6,280 | 6,530 |
| Viscosity retention ratio (%) |  | 57 | 61 | 59 | 81 | 77 | 75 | 78 |

|  |  | Example 38 | Example 39 | Example 40 | Example 41 | Example 42 | Example 43 |
|---|---|---|---|---|---|---|---|
| Cellulose fiber | Cellulose species | a5 | a5 | a5 | a5 | a5 | a5 |
|  | Concentration (mass %) | 0.4 | 0.4 | 0.05 | 0.8 | 0.4 | 0.1 |
| Alcohol | Species | d6 | d7 | d1 | d1 | d1 | d1 |
|  | Concentration (mass %) | 60 | 60 | 60 | 60 | 40 | 90 |
| Viscosity of alcohol-containing preparation (mPa · s) |  | 6,110 | 6,610 | 8 | 17,900 | 8,200 | 60 |
| Viscosity retention ratio (%) |  | 73 | 79 | 91 | 66 | 98 | 46 |

TABLE 5

|  |  | Comparative Example 3 | Comparative Example 4 | Comparative Example 5 |
|---|---|---|---|---|
| Cellulose fiber | Cellulose species | a12 | a1 | — |
|  | Concentration (mass %) | 0.4 | 0.4 | 0 |
| Alcohol | Species | d1 | d1 | d1 |
|  | Concentration (mass %) | 60 | 60 | 60 |
| Viscosity of alcohol-containing preparation (mPa · s) |  | 3,450 | 152 | 1 or less |
| Viscosity retention ratio (%) |  | 35 | 16 | — |

In Tables 4 and 5, d1 to d8 are as follows.
d1: ethanol
d2: methanol
d3: isopropanol
d4: 1-propanol
d5: pentylene glycol
d6: 1,3-butylene glycol
d7: glycerol As described in Table 5, in Comparative Example 3, neutralization was performed using the monoamine (B) being low-molecular-weight amine AMP alone, so that steric repulsive force was not exerted and the fibers aggregated, which resulted in the low viscosity retention ratio. In Comparative Example 4, the cellulose fiber was prepared by neutralization using the monoamine (A) being long-chain alkylamine LDEA and sodium in combination, so that, because of the low affinity of sodium for alcohol, the fibers aggregated, which resulted in the low viscosity retention ratio. In Comparative Example 5, cellulose fibers were not included, so that the thickening effect was not provided.

By contrast, as described in Table 4, alcohol-containing preparations prepared using cellulose fibers prepared by neutralization using the monoamine (A) and the monoamine (B) in combination according to embodiments have, compared with Comparative Examples 3 and 4, high viscosity retention ratios; in particular, in the case of a cellulose fiber concentration of 0.05 mass % or more and an alcohol concentration of 90 mass % or less, high viscosity retention ratios were provided. This was inferentially because, by using the combination of the monoamine (A) being a long-chain alkylamine and the monoamine (B) being a low-molecular-weight amine, the cellulose fiber was made hydrophobic and the steric repulsive force suppressed aggregation, which improved the dispersibility in alcohol.

As have been described so far, the viscous aqueous compositions according to embodiments can be suitably used as emulsifiers for emulsifying oil-based raw materials and thickeners for alcohol-containing preparations. The viscous aqueous compositions also have high safety and hence can be suitably used in the fields of skin external preparations in which such performance is in demand, such as cosmetics, pharmaceuticals, and quasi-drugs.

Some embodiments according to the present invention have been described so far; however, these embodiments are provided as examples and are not intended to limit the scope of the invention. These embodiments can be carried out in various forms and can be subjected to various omission, replacement, or modification without departing from the spirit of the invention. These embodiments and omission, replacement, modification, and the like thereof are included in the scope and spirit of the invention and are similarly included in the invention described in CLAIMS and the scope of equivalents of the invention.

The invention claimed is:
1. A viscous aqueous composition, comprising:
water; and
an anion-modified cellulose fiber including anionic groups forming salts with monoamines, wherein the monoamines include a first monoamine having an organic value of 200 or more and a second monoamine having an organic value of less than 200 in an organic conceptual diagram, and the first monoamine and the second monoamine have a molar ratio of from 1:99 to 10:90.

2. The viscous aqueous composition according to claim 1, wherein the first monoamine has an organic value of 240 or more and the second monoamine has an organic value of 180 or less in an organic conceptual diagram.

3. An emulsion composition, comprising:
the viscous aqueous composition of claim 1; and
an oil-based raw material.

4. A skin external preparation, comprising:
the emulsion composition of claim 3.

5. A solvent-containing viscous composition prepared by a process comprising mixing the viscous aqueous composition of claim 1 with a water-miscible organic solvent, wherein a content of the water-miscible organic solvent is in a range of 10 to 95 mass %.

6. A skin external preparation, comprising:
the solvent-containing viscous composition of claim 5.

7. An emulsion composition, comprising:
the viscous aqueous composition of claim 2; and
an oil-based raw material.

8. A skin external preparation, comprising:
the emulsion composition of claim 7.

9. A solvent-containing viscous composition prepared by a process comprising mixing the viscous aqueous composition of claim 2 with a water-miscible organic solvent, wherein a content of the water-miscible organic solvent is in a range of 10 to 95 mass %.

10. A skin external preparation, comprising:
the solvent-containing viscous composition of claim 9.

* * * * *